United States Patent
Siekman

(10) Patent No.: US 12,512,990 B2
(45) Date of Patent: Dec. 30, 2025

(54) SYSTEM AND METHOD FOR IMPLEMENTING TOKEN-BASED AUTHENTICATION OF TEXT MESSAGES

(71) Applicant: Bank of America Corporation, Charlotte, NC (US)

(72) Inventor: James Siekman, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 177 days.

(21) Appl. No.: 18/156,863

(22) Filed: Jan. 19, 2023

(65) Prior Publication Data

US 2024/0250819 A1    Jul. 25, 2024

(51) Int. Cl.
*H04L 9/32* (2006.01)
*H04L 9/08* (2006.01)

(52) U.S. Cl.
CPC .......... *H04L 9/3213* (2013.01); *H04L 9/0891* (2013.01); *H04L 9/3228* (2013.01)

(58) Field of Classification Search
CPC .... H04L 9/3213; H04L 9/0891; H04L 9/3228
USPC ........................................................ 713/168
See application file for complete search history.

(56) References Cited

U.S. PATENT DOCUMENTS

| | | | |
|---|---|---|---|
| 7,970,381 B2 | 6/2011 | Chesnutt et al. | |
| 7,970,837 B2 | 6/2011 | Lyle et al. | |
| 8,341,714 B2 | 12/2012 | Mller et al. | |
| 8,495,720 B2 | 7/2013 | Counterman | |
| 8,656,180 B2 | 2/2014 | Shablygin et al. | |
| 8,769,626 B2 | 7/2014 | Gundavelli et al. | |
| 9,940,184 B2 | 4/2018 | Shibuya | |
| 9,953,166 B2 | 4/2018 | Newell | |
| 9,973,518 B2 | 5/2018 | Lee et al. | |
| 10,003,495 B1 * | 6/2018 | Sharma | H04L 41/0806 |
| 10,326,667 B2 | 6/2019 | Jones et al. | |
| 10,389,606 B2 | 8/2019 | Sartran et al. | |
| 10,992,659 B2 | 4/2021 | Mossoba et al. | |
| 11,010,762 B2 | 5/2021 | Hajimusa et al. | |
| 11,240,218 B2 | 2/2022 | Wu et al. | |
| 11,438,737 B2 | 9/2022 | Steeves et al. | |
| 2012/0084561 A1 * | 4/2012 | Soulios | H04L 9/3213 713/168 |
| 2012/0155349 A1 * | 6/2012 | Bajic | H04L 69/08 370/310 |
| 2012/0221468 A1 * | 8/2012 | Kumnick | G06Q 20/306 705/44 |

(Continued)

*Primary Examiner* — Teshome Hailu

(57) ABSTRACT

A system for implementing token-based authentication of text messages comprises an entity server in communication with a token server. The entity server sends a first message to the token server to request for a security token. The first message includes entity and user information with a reason for generating the security token. The token server generates the security token and sends it to the entity server. The token server stores the security token and associated data in a memory of the token server. The entity server sends a second message and the security token to a user device. The token server receives the second message and the security token from the user device for verification, and determines that the security token associated with the second message matches the stored data in the memory. The token server sends a validation message to the user device that the second message is authenticated.

20 Claims, 2 Drawing Sheets

(56) References Cited

U.S. PATENT DOCUMENTS

| | | | |
|---|---|---|---|
| 2013/0094622 A1* | 4/2013 | Yu | G08B 5/38 |
| | | | 375/354 |
| 2014/0180702 A1* | 6/2014 | Mansker | G16H 40/00 |
| | | | 705/2 |
| 2015/0032627 A1* | 1/2015 | Dill | G06Q 20/385 |
| | | | 705/44 |
| 2020/0302517 A1 | 9/2020 | Steele et al. | |
| 2021/0314348 A1 | 10/2021 | Emigh et al. | |

* cited by examiner

SYSTEM AND METHOD FOR IMPLEMENTING TOKEN-BASED AUTHENTICATION OF TEXT MESSAGES

TECHNICAL FIELD

The present disclosure relates generally to network communications and network security, and more specifically to a system and method for implementing token-based authentication of text messages.

BACKGROUND

Text messages have been widely used for transferring sensitive information between computing devices. An entity may send a text message containing sensitive information to a user device associated with a user for verifying user information or user interactions with the entity. Such a conventional approach may not prevent anomalous messages from being sent by bad actors to gain unauthorized access to a user's sensitive information. Current technologies are not configured to provide a reliable and efficient solution to verify the text message that a user receives.

SUMMARY

Conventional technologies are not configured to provide a reliable and efficient solution to prevent anomalous messages from being sent by bad actors to gain unauthorized access to a user's sensitive information communicated in text messages. The system described in the present disclosure is particularly integrated into a practical application of implementing token-based authentication of text messages to improve the security of communicating text messages.

In a current system, entities usually communicate with their users using text messages. However, bad actors may emulate those messages on behalf of the entities and embed malicious links or malicious software with the text messages. As a result, a user who receives a text message may not be able to trust that the text is actually coming from an entity. The present system addresses this issue by the use of a security token that is included in a text message. The security token can be used to verify an authenticity of the text message that an entity communicates to a user. In one example, when an entity wants to communicate a text message with a security token to a user, an entity first communicates with a token server to obtain the security token. The security token includes information that can be used to verify the authenticity of the text message. The communication data (e.g., a first message) from the entity to the token server includes the information associated with the entity, the user and a reason for sending a message from the entity to the user. The token server generates a security token based on the communication data from the entity and sends the generated security token to the entity. The token server further stores the data associated with the generated security token in a memory of the token server. When the entity server receives the security token from the token server, the entity server embeds the security token into a text message (e.g., a second message) and sends the text message to the user. When a user device of the user receives the text message and the security token from the entity, the user device will automatically communicate the text message with the security token to the token server. The token server performs a verification of the text message with the security token to determine whether the security token is a valid token from a valid entity. The token server will determine whether the received security token from the user device matches the stored data of the previously generated security token in the memory of the token server. For example, the token server compares whether the received security token and the stored data in the memory of the token server match each other. For example, they include the same data features of an entity identifier, a user identifier, and a reason for sending the message from the entity to the user, a token expiration time, etc. In response to determining a match, the token server determines that the received security token from the user device is a valid token from the valid entity. The token server will communicate back to the user device and indicate that the text message with the security token is authentic based on analyzing the security token.

In one embodiment, a system for implementing token-based authentication of text messages comprises an entity server in communication with a token server. The entity server is configured to send a first message to a token server to request the token server to generate a security token. The first message includes data comprising entity information, user information, and a reason for generating the security token. The token server sends the security token to the entity server. The security token comprises the data of the first message. The token server stores the data and the security token in a memory of the token server. The entity server sends a second message and the security token to a user device associated with a user. The token server receives the second message and the security token from the user device for verification. The token server verifies the second message by determining whether the security token associated with the second message matches the stored data in the memory of the token server. The token server sends a validation message back to the user device in response to determining that the security token associated with the second message matches the stored data in the memory of the token server. The token server presents the validation message to the user device with a first user interface element indicating that the second message is valid.

The system described in the present disclosure is particularly integrated into a practical application and provides technical solutions of authenticating text messages with security tokens. The practical application of a message verification process is implemented by generating and verifying token-based authentication codes associated with the text messages. It may be implemented by an entity server in communication with a token server to provide a solution of message verification process using token-based authentication of text messages. For example, the token server may generate a security token based on data of a first message from the entity server. The server entity generates a second message with the security token and sends them to a user device associated with a user. Further, the token server may verify a second message with the security token received from a user device to determine whether the second message and the corresponding security token are authenticated. When the token server determines that the security token associated with the second message matches the stored data in the memory of the token server, the token server sends a validation message back to the user device to inform the user that the second message and the security token are authenticated. Otherwise, the token server sends the token server sends an invalidation message back to the user device to inform the user that the second message and the corresponding token are unauthenticated or malicious. In this way, the practical application provides a reliable and effective solution to authenticate text messages received by users and provide authentication verification results to the user.

The practical application leads to technical advantages of improving the current message authentication process. The disclosed system may effectively verify the authenticity of the text messages and effectively preventing bad actors from gaining unauthorized access to a user's sensitive information through emulated messages in the network. The disclosed system may further improve network security between the computer systems of the computer network and improve information security and data loss prevention.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Previous technologies fail to provide reliable network security solutions to verifying an authenticity of a text message. This disclosure presents a system for implementing token-based authentication of text messages by referring to FIGS. 1-2.

System Overview

Figure 1:
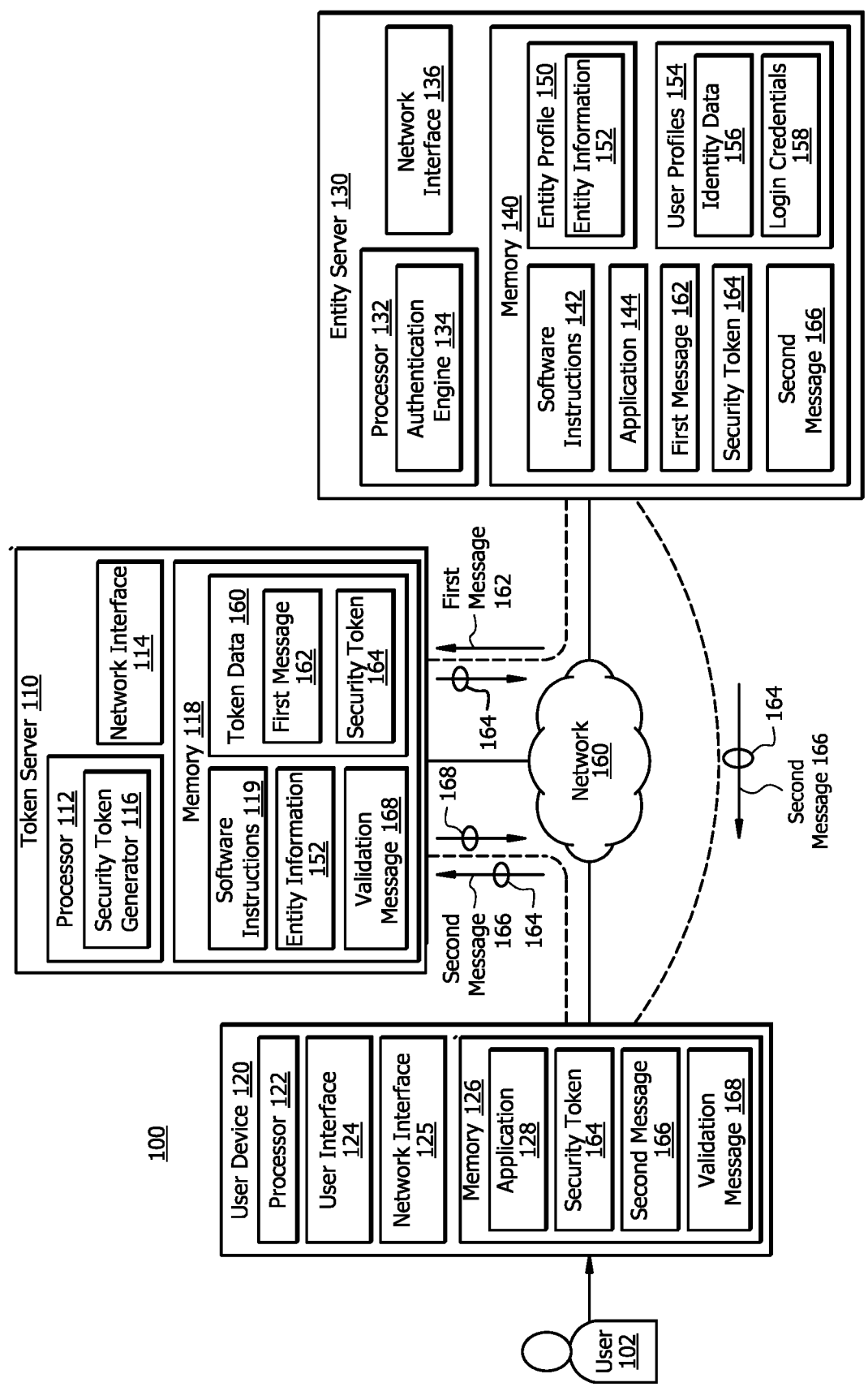
FIG. 1 illustrates an embodiment of a system configured to implement token-based authentication of text messages.

FIG. 1 illustrates one embodiment of a system 100 that is configured to implement token-based authentication of text messages. In some embodiments, system 100 comprises an entity server 130, a token server 110, a user device 120, and a network 160. Network 160 enables the communication between components of the system 100. Entity server 130 comprises a processor 132 in signal communication with a memory 140. Memory 140 stores software instructions 142 that when executed by the entity server 130, cause the entity server 130 to execute one or more functions described herein. For example, when the software instructions 142 are executed, the entity server 130 executes an authentication engine 134 to perform operations illustrated in FIG. 2. Token server 110 comprises a processor 112 in signal communication with a memory 118. Memory 118 stores software instructions 119 that when executed by the token server 110, cause the token server 110 to perform operations illustrated in FIG. 2. In other embodiments, system 100 may not have all the components listed and/or may have other elements instead of, or in addition to, those listed above.

In some embodiments, the system 100 may be implemented by the entity server 130 and the token server 110 to implement token-based authentication of text messages. The token server 110 is communicatively coupled to the entity server 130. When an entity wants to communicate a text message to a user, an entity first communicates with the token server 110 through the entity server 130 to obtain a security token 164. The security token 164 includes information that can be used to verify the authenticity of a text message. The entity server 130 is configured to send communication data or a first message 162 to the token server 110 to request the token server 110 to generate a security token 164. The first message 162 from the entity to the token server 110 includes data comprising entity information, user information, and a reason for generating the security token 164. The token server 110 generates the security token 164 based on the first message 162 and other information associated with the security token 164. The token server 110 stores token data 160 in a memory 118 of the token server 110. The stored token data 160 is associated with the security token 164 generated based on the first message 162. The token data 160 includes the first message 162, the security token 164 and other features associated with the token. For example, the token data 160 includes an entity identifier of the entity, a user identifier of the user, an expiration time of the security token 164, an interaction between the user 102 and the entity, and information of a software executed to generate the security token 164, etc. The token server 110 sends the security token 164 to the entity server 130. When the entity server 130 receives the security token 164 from the token server 110, the entity server 130 embeds the security token 164 into a second message 166. The entity server 130 sends the second message 166 and the security token 164 to a user device 120 associated with a user 102. When the user device 120 receives the second message 166 and the security token 164 from the entity server 130, the user device 120 may automatically communicate the second message 166 with the security token 164 to the token server 110 for verifying an authenticity of a second message. The token server 110 receives the second message 166 and the security token 164 from the user device 120 for verification. The token server 110 verifies the second message 166 and the security token 164 from the user device 120 by determining whether each feature stored in the security token 164 associated with the second message 166 matches the stored token data 160 in the memory 118 of the token server 110. In response to determining a match between data stored in the security token 164 associated with the second message 166 and the stored token data 160 of the previously generated security token 164 in the memory 118 of the token server 110, the token server 110 may communicate back to the user device 120 and indicate that the second message 166 and the security token 164 are authenticated and valid. If, on the other hand, the token server 110 determines that each feature stored in the security token 164 associated with the second message 166 does not match the stored token data of the previous generated security token 164 based on the first message 162 from the entity in the memory 118 of the token server 110, the token server 110 may present another user interface element indicating that the second message 166 and the security token 164 are unauthenticated and invalid.

System Components

Network

Network 160 may be any suitable type of wireless and/or wired network, including, but not limited to, all or a portion of the Internet, an Intranet, a private network, a public network, a peer-to-peer network, the public switched telephone network, a cellular network, a local area network (LAN), a metropolitan area network (MAN), a wide area network (WAN), and a satellite network. The network 160 may be configured to support any suitable type of communication protocol as would be appreciated by one of ordinary skill in the art.

User Device

User device 120 is generally any computing device that is configured to process data and interact with a user 102. Examples of the user device 120 include, but are not limited to, a personal computer, a desktop computer, a workstation, a server, a laptop, a tablet computer, a mobile phone (such as a smartphone), etc. The user device 120 may include a hardware processor 122, memory 126, and/or circuitry configured to perform any of the functions or actions of the user device 120 described herein. The processor 122 may include one or more processors operably coupled to and in signal communication with the memory 126, user interface 124, network interface 125, and other components in the system 100. The one or more processors 122 may be any electronic circuitry, including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). The one or more processors 122 may be a programmable logic device, a microcontroller, a microprocessor, or any suitable combination of the preceding. The one or more processors 122 are configured to process data and may be implemented in hardware or software. For example, the processor may be 8-bit, 16-bit, 32-bit, 64-bit, or of any other suitable architecture. The processor 122 may include an arithmetic logic unit (ALU) for performing arithmetic and logic operations. For example, one or more software applications designed using software code may be stored in the memory 126 and executed by the processor 122 to perform the functions of the user device 120.

In some embodiments, the memory 126 may store an application 128. The application 128 may be software instructions, a mobile application, or a web application that is executed by processor 122 to implement various operations described herein. Application 128 may be used by the user device 120 to access an application 144 for an application service provided by an entity through an entity server 130.

The user interface 124 may include a display, a microphone, keypad, or other appropriate terminal equipment usable by a user 102. The network interface 125 may be configured to use any suitable type of communication protocol and enable wired and/or wireless communications as would be appreciated by one of ordinary skill in the art.

Entity Server

Entity server 130 is generally a server, or any other device configured to process data and communicate with token server 110 and computing devices (e.g., user device 120), etc., via the network 160. The entity server 130 is generally configured to execute the operations of the authentication engine 134, as described further below in conjunction with operational flow of the method 200 described in FIG. 2. The entity server 130 may be a central server implemented in the cloud or, alternatively, it may be organized in a distributed manner.

Entity server 130 comprises one or more processors 132 operably coupled to the memory 140. The entity server 130 is any electronic circuitry, including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). The processor 132 may be a programmable logic device, a microcontroller, a microprocessor, or any suitable combination of the preceding. The one or more processors are configured to process data and may be implemented in hardware or software. For example, the processor 132 may be 8-bit, 16-bit, 32-bit, 64-bit, or of any other suitable architecture. The processor 132 may include an arithmetic logic unit (ALU) for performing arithmetic and logic operations. The processor 132 registers the supply operands to the ALU and store the results of ALU operations, and a control unit that fetches instructions from memory and executes them by directing the coordinated operations of the ALU, registers and other components. The one or more processors are configured to implement various instructions. For example, the one or more processors are configured to execute instructions (e.g., software instructions 142) to implement the authentication engine 134 and/or to execute one or more operations described herein with respect to entity server 130. In this way, the processor 132 may be a special-purpose computer designed to implement the functions disclosed herein. In one embodiment, the processor 132 is implemented using logic units, FPGAs, ASICs, DSPs, or any other suitable hardware. The processor 132 is configured to operate to execute the authentication engine 134 to perform one or more operations as described in FIG. 2.

Memory 140 may be volatile or non-volatile and may comprise a read-only memory (ROM), random-access memory (RAM), ternary content-addressable memory (TCAM), dynamic random-access memory (DRAM), and static random-access memory (SRAM). Memory 140 may be implemented using one or more disks, tape drives, solid-state drives, and/or the like. The memory 140 is operable to store the software instructions 142 and/or any other data or instructions. The software instructions 142 may store any suitable set of instructions, logic, rules, or code operable to be executed by the processor 132 to implement the processes and embodiments described below. In an example operation, the memory 140 may store an application 144 and other program modules which are implemented by processor 132 in computer-executable software instructions, such as software instructions 142. The memory 140 is operable to store an entity profile 150, user profiles 154, messages 162 and 166, security token 164, and/or any other data or instructions.

The entity profile 150 may include entity information 152, such as an entity identifier, entity phone number, entity email address, entity name, and entity weblink, and any other data associated with the entity. A user profile 154 may be user information including user identity data 156 and login credentials 158. The user identity data 156 may include a user identifier, user phone number, user email address, user name, and any other data associated with the user.

The application 144 may be associated with an organization entity that provides application services to users 102. The application 144 may be configured to create a user profile 154 with login credentials 158 for a user 102 and a user device 120 to interact with the entity, such as, for example, to access application services (e.g., application 144). The user 102 may operate the user device 120 to log in on the application 144. An entity server 130 associated with the application 144 may be configured to evaluate whether the user login credentials 158 are valid based on comparing the provided login credentials with login credentials 158 stored in a memory 140. If the user identity is verified, the user 102 may access the application 144 for an application service.

Network interface 136 is configured to enable wired and/or wireless communications (e.g., via network 160). The network interface 136 is configured to communicate data between the entity server 130 and other devices (e.g., user device 120), databases, systems, or domains. For example, the network interface 136 may comprise a WIFI interface, a local area network (LAN) interface, a wide area network (WAN) interface, a modem, a switch, or a router. The processor 132 is configured to send and receive data using the network interface 136. The network interface 136 may be configured to use any suitable type of communication protocol as would be appreciated by one of ordinary skill in the art.

Token Server

Token server 110 is generally a server, or any other device configured to process data and communicate with entity server 130 and user devices 120, etc., via the network 160. The token server 110 is generally configured to execute the operations of a security token generator 116, as described further below in the operational flow of the method 200 described in FIG. 2. In one embodiment, the security token generator 116 may be implemented by the token server 110 executed by the processor 112 to execute software instructions 119 to generate security tokens 164 for the entity server 130 to authenticate messages that the entity server 130 sends to users. An example security token 164 may be a multi-factor authentication code used to authenticate text messages associated with the entity server 130 as described in operations illustrated in FIG. 2. In one embodiment, the security token generator 116 may be implemented by the token server 110 executed by the processor 112 to generate a security token 164 for verifying an authenticity of a second message 166 with the security token 164 by executing one or more operations described herein.

Token server 110 comprises one or more processors 112 operably coupled to the memory 118. The token server 110 is any electronic circuitry, including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). The processor 112 may be a programmable logic device, a microcontroller, a microprocessor, or any suitable combination of the preceding. The one or more processors are configured to process data and may be implemented in hardware or software. For example, the processor 112 may be 8-bit, 16-bit, 32-bit, 64-bit, or of any other suitable architecture. The processor 112 may include an arithmetic logic unit (ALU) for performing arithmetic and logic operations. The processor 112 registers the supply operands to the ALU and store the results of ALU operations, and a control unit that fetches instructions from memory 118 and executes them by directing the coordinated operations of the ALU, registers and other components. The one or more processors are configured to implement various software instructions 119. In this way, the processor 112 may be a special-purpose computer designed to implement the functions disclosed herein. In one embodiment, the processor 112 is implemented using logic units, FPGAs, ASICs, DSPs, or any other suitable hardware. The processor 112 is configured to operate to perform one or more operations as described in FIG. 2.

Memory 118 may be volatile or non-volatile and may comprise a read-only memory (ROM), random-access memory (RAM), ternary content-addressable memory (TCAM), dynamic random-access memory (DRAM), and static random-access memory (SRAM). Memory 118 may be implemented using one or more disks, tape drives, solid-state drives, and/or the like.

The memory 118 is operable to store the software instructions 119 and/or any other data or instructions. The software instructions 119 may store any suitable set of instructions, logic, rules, or code operable to be executed by the processor 112 to implement the processes and embodiments described below. The memory 118 may be operable to store entity information 152, a message from the entity server 130 (e.g., a first message 162), token data 160, a validation message 168, and/or any other data or instructions. The token data 160 may include a security token 164, a first message 162, and any other data associated with the security token 164. The entity information 152 stored in the memory 118 may include an entity identifier, entity phone number, entity email address, entity name, and entity weblink, and any other data associated with the entity.

The token server 110 may include a network interface 114 which is configured to enable wired and/or wireless communications (e.g., via network 160). The network interface 114 may be configured to communicate data between the entity server 130 and other computing devices (e.g., user device 120), databases, systems, or domains. For example, the network interface 114 may comprise a WIFI interface, a local area network (LAN) interface, a wide area network (WAN) interface, a modem, a switch, or a router. The processor 112 is configured to send and receive data using the network interface 114. The network interface 114 may be configured to use any suitable type of communication protocol as would be appreciated by one of ordinary skill in the art.

Authentication Engine

In some embodiments, when an entity wants to communicate a text message with a security token 164 to a user, an entity first communicates with a token server 110 to obtain a security token 164 that includes information that can be used to verify the authenticity of the text message. In some embodiments, an authentication engine 134 of the entity server 130 may be implemented by the processor 132 to execute the software instructions 142 to communicate a first message 162 to a token server 110 to request the token server 110 to generate a security token 164. The security token 164 includes information that can be used to verify an authenticity of a text message that the entity server 130 sends to the user. The first message 162 includes the information associated with the entity, a user 102 and a reason for sending a text message from the entity to the user. After the entity server 130 receives the security token 164 from the token server 110, the authentication engine 134 of the entity server 130 may be implemented by the processor 132 by executing the software instructions 142 to generate a second message 166 embedded with the security token 164. Further, the authentication engine 134 of the entity server 130 may be implemented by the processor 132 by executing the software instructions 142 to communicate the second message 166 with the security token 164 to a user device 120 associated with a user 102. The second message 166 with the security token 164 may be configured to be activated for a user 102 to interact with the entity through a user device 120. The second message 166 may be associated with a certain application service between the user 102 and the entity, such as confirming a change to a user profile 154 that the user 102 registers with the entity, verifying an interactions that the user 102 recently conducted with the entity, etc.

Generate a Security Token and an Authenticated Message

An entity communicates a text message with the security token 164 to a user. The security token 164 can be used to verify the authenticity of the text message. A security token generator 116 of a token server 110 may be implemented by the processor 112 to execute the software instructions 119 to generate a security token 164 for the entity.

In some embodiments, a security token generator 116 of the token server 110 may be executed by the processor 112 to execute the software instructions 119 to receive a first message 162 from an entity server 130 to generate a security token 164. The first message 162 from the entity server 130 may include entity information 152, user information, and a reason for generating the security token 164. For example, entity information 152 may include data associated with an entity, such as an entity identifier, entity phone number, entity email address, entity name, and entity weblink, and any other data associated with the entity. The user information may include data associated with a user, such as a user identifier, user phone number, user email address, user name, and any other data associated with the user. In some embodiments, the user identifier may be a user phone number or a user email. The entity identifier may be an entity phone number or an entity email. The reason for generating the security token 164 may include certain instructions associated with one or more application services provided by the entity to the user. For example, the entity uses a security token 164 to communicate a text message to a user 102 for asking the user 102 to confirm a change to a user profile 154 that the user 102 registers with the entity. In another example, the entity uses a security token 164 to communicate a text message to the user 102 for verifying an interaction that the user 102 recently conducted with the entity or other users through the entity server 130, etc.

In some embodiments, in response to the receiving the first message 162 from the entity, the token server 110 may be executed by the processor 112 to determine that the entity registers with the token server 110 before generating a security token 164 for the entity. The token server 110 may determine that the first message 162 comprises the entity information 152 that the entity registers with the token server 110. For example, the token server 110 may determine whether an entity identifier of the entity information 152 from the first message 162 matches an entity identifier of the stored entity information 152 in the memory 118 of the token server 110. In response to determining a match, the security token generator 116 of the token server 110 may be executed by the processor 112 to generate the security token 164 based on the data of the first message 162 received from the entity server 130.

The token server 110 may generate a security token 164 in response to each message or request from the entity server 130. In some embodiments, the security token 164 may include an authentication code or an access key (e.g., password) to allow the user 102 of the user device 120 to interact with the entity. In one embodiment, the security token generator 116 may be configured to generate a specific type of n-digit-token, such as a multi-factor authentication token. In one embodiment, the security token generator 116 may be configured to generate a random number and/or a random alphanumeric string as a token code of a security token 164. The security token 164 may include data of the first message 162, such as entity information 152, user information, and a reason for generating the security token 164. The data of the first message 162 from the entity server 130 may be embedded in the security token 164. In some embodiments, the security token 164 may include data associated with the token server 110. The data embedded in the security token 164 may include a plurality of features associated with the user, the user device 120, the entity, the entity server 130, and the token server 110. For example, the plurality of the features may include an entity identifier of the entity, a user identifier of the user, an expiration time of the security token 164, an interaction between the user 102 and the entity, and information of a software executed to generate the security token 164, any information associated with the token server 110. The token server 110 may store the token data 160 associated with in the security token 164 in the memory 118 of the token server 110. The token server 110 communicates the security token 164 associated with the first message 162 to the entity server 130.

The entity server 130 may generate a second message 166 with the security token 164. The second message 166 may include certain instructions associated with one or more application services between the user 102 and the entity. As described above, the entity may communicate a second message 166 with the security token 164 to a user device 120 associated with a user 102 for asking the user 102 to confirm a change to a user profile 154 that the user 102 registers with the entity.

The entity server 130 may communicate a second message 166 with the security token 164 to the user device 120 associated with the user 102 in a number of different ways. For example, the entity server 130 may communicate the second message 166 and the security token 164 to the user device 120 separately. In another example, the entity server 130 may communicate the second message 166 with the security token 164 embedded in the second message 166 to the user device 120. The security token 164 may be configured to be activated by a user 102 through a user device 120 to interact with the entity for a certain application service.

Verify a Message With a Security Token

The user 102 may receive the second message 166 and the security token 164 through the user device 120 via the network 160. The user 102 may not be able to trust that the second message 166 and the security token 164 are actually coming from the entity. The user 102 verifies the authenticity of the second message 166 and the security token 164. The second message 166 may include token server information which may be used by the user 102 and the user device 120 to communicate the second message 166 and the security token 164 to the token server 110 for verification. For example, when the user device 120 associated with the user receives the second message 166 and the security token 164 from the entity, the user device 120 may automatically communicate the second message 166 with the security token 164 to the token server 110 for verification.

The token server 110 may receive the second message 166 and the security token 164 from the user device 120. The token server 110 may verify the second message 166 by determining whether the data stored in the security token 164 associated with the second message 166 matches the token data 160 stored in the memory 118 of the token server 110. The data stored in the security token 164 may include a plurality of features of the received security token 164. For example, The plurality of features of the received security token 164 may include an entity identifier, a user identifier, an expiration time of the security token 164, an interaction between the user 102 and the entity, and information of a software executed to generate the security token 164, etc. The token server 110 may determine whether each of the plurality of features of the received security token 164 from the user device 120 matches the token data 160 stored in the memory 118 of the token server 110. In some embodiments, the token server 110 may determine a code of the security token 164 matches a code of a stored security token 164 in the memory 118 of the token server 110. The token server 110 may further determine whether the plurality of the features of the received security token 164 is the same as the plurality of features associated with the token data 160 stored in the memory 118 of the token server 110.

If each feature of the security token 164 associated with the second message 166 matches each of the plurality of features associated the security token 164 stored in the memory 118 of the token server 110, the token server 110 verifies that the second message 166 and the security token 164 are authenticated and valid. The token server 110 may send a validation message 168 presented to the user device 120 with a first user interface element. The validation message 168 may indicate that the second message 166 is an authenticated text message and the security token 164 is valid. The first user interface element may be an approval indicator (e.g., a green check mark) representing that the second message 166 is an authenticated text message and the security token 164 is valid. Otherwise, the token server 110 sends an invalidation message back to the user device 120 with a second user interface element which indicates that the second message 166 is unauthenticated and the security token 164 is invalid. The second user interface element may be configured to be activated by the user 102 to delete the second message 166 and the corresponding security token 164.

Example Operational Flow for Enhancing Multi-Factor Authentication

Figure 2:
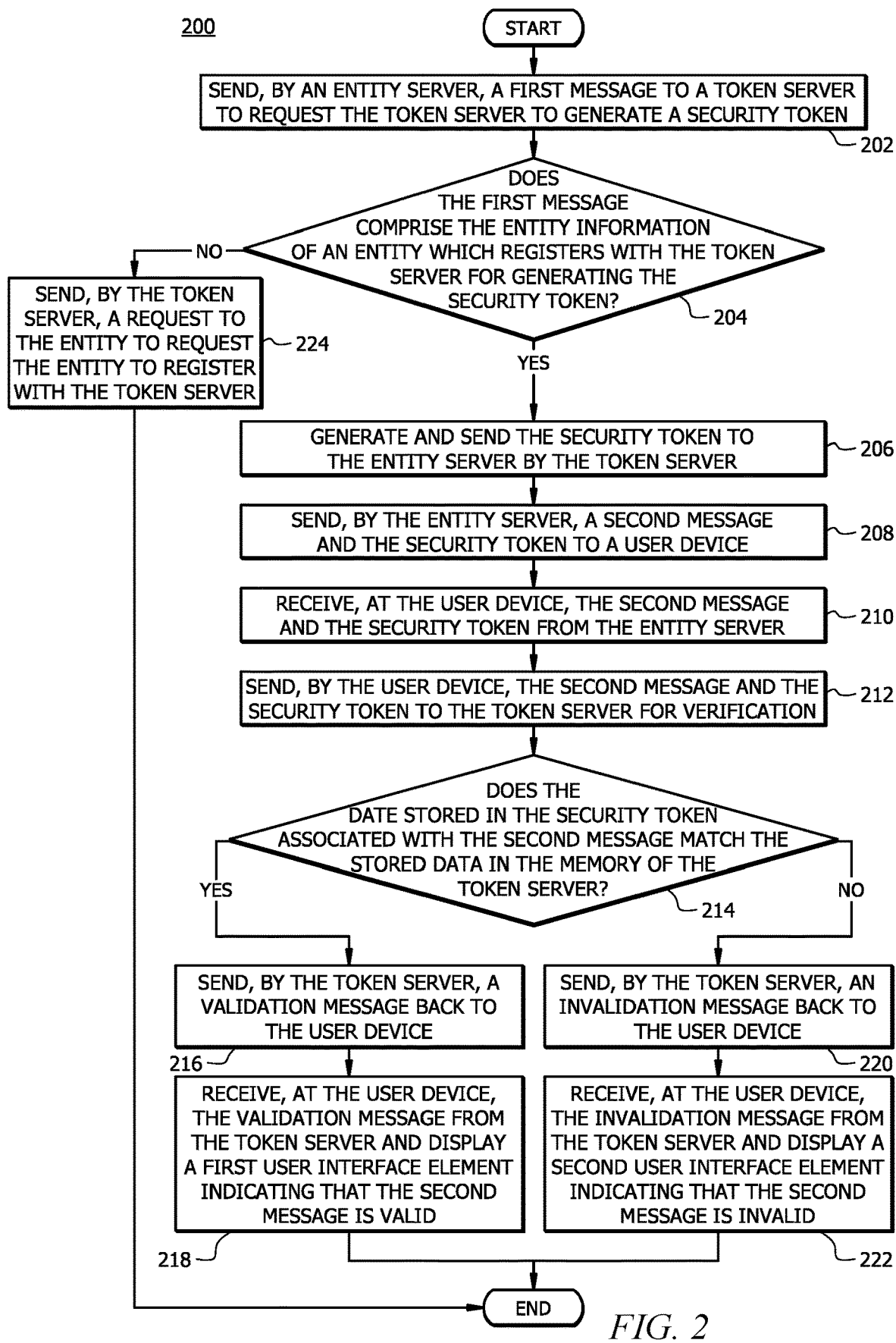
FIG. 2 illustrates an example operational flow of a method for implementing token-based authentication of text messages.

FIG. 2 illustrates an example flow of a method 200 for implementing token-based authentication of text messages in the system 100. Modifications, additions, or omissions may be made to method 200. Method 200 may include more, fewer, or other operations. For example, operations may be performed by the entity server 130 and the token server 110 in parallel or in any suitable order. While at times discussed as the system 100, processor 132, processor 112, authentication engine 134, security token generator 116 or components of any of thereof performing operations, any suitable system or components of the system may perform one or more operations of the method 200. For example, one or more operations of method 200 may be implemented, at least by the entity server 130 and the token server 110 to perform operations 202-224.

The method 200 begins at operation 202 where an entity server 130 sends a first message 162 to a token server 110 to request the token server 110 to generate a security token 164. The token server 110 is in communication with the entity server 130 via a network 160. The first message 162 includes data comprising entity information 152, user information, and a reason for generating the security token 164.

At operation 204, the token server 110 may verify whether the first message 162 comprises the entity information 152 of an entity which registers with the token server 110 for generating the security token 164. For example, the entity information may comprise an entity identifier that the entity uses to register with the token server 110. The token server 110 may verify whether the first message 162 is associated with the entity identifier. At operation 224, in response to determining that an entity registers with the token server 110 or the first message 162 is not associated with the entity identifier for generating the security token 164, the token server 110 may send a weblink to the entity to request the entity to register with the token server 110.

At operation 206, in response to determining that the entity registers with the token server 110 or the first message 162 is associated with the entity identifier for generating the security token 164, the token server 110 may generate the security token 164 based on data of the first message 162 received from the entity server 130. The token server 110 may store the security token 164 and the associated data in a memory 118 of the token server 110. The token server 110 may communicate the security token 164 to the entity server 130.

At operation 208, the entity server 130 may send a second message 166 and the security token 164 to a user device 120 associated with a user 102. For example, the entity server 130 may receive the security token 164 from the token server 110. The entity server 130 may generate a second message 166 with a purpose of sending the message to the user 102 and allow the user 102 to interact with the entity.

At operation 210, the user device 120 receives the second message 166 and the security token 164 from the entity server 130. For example, the user 102 may receive the second message 166 and the security token 164 through the user device 120 via the network 160. The second message 166 and the security token 164 may indicate that the second message 166 is sent by the entity. The user 102 verifies whether the second message 166 and the security token 164 are authorized by the entity.

At operation 212, the user device 120 may send a request to the token server 110 with the second message 166 and the security token 164 to the token server 110 for verification. The second message 166 may comprise token server information. In one embodiment, when the user device 120 associated with the user 102 receives the second message 166 and the security token 164 from the entity, the user device 120 may automatically communicate the second message 166 with the security token 164 to the token server 110. In one embodiment, the token server information in the second message 166 may include a communication link associated with the token server 110 which generates the security token 164. The user may send the second message 166 and the security token 164 to the token server 110 for verification through the user device 120 with token server information.

At operation 214, the token server 110 receives the second message 166 and the security token 164 from the user device 120 for verification. The token server 110 may verify the second message 166 by determining whether the data stored in the security token 164 associated with the second message 166 matches the stored token data in the memory 118 of the token server 110. For example, the token server 110 may verify whether each feature of the received security token 164 matches the stored token data associated with the security token 164 in the memory 118 of the token server 110. A plurality of features of the security token 164 may include an entity identifier, a user identifier, an expiration time of the security token 164, an interaction between the user and the entity, and information of a software executed to generate the security token 164, etc.

At operation 216, in response to determining that the data stored in the security token 164 associated with the second message 166 matches the stored token data 160 in the memory 118 of the token server 110, the token server 110 sends a validation message 168 back to the user device 120. For example, the token server 110 determines that each feature of the received security token 164 matches the stored token data 160 associated with the previously generated security token 164. In response to determining that the data stored in the security token 164 associated with the second message 166 does not match the stored data associated with the previously generated security token 164 in the memory 118 of the token server 110, the method 200 proceeds to operations 220-222.

The validation message 168 is presented to the user device 120 with a first user interface element, such as a green check mark which indicates that the second message 166 and the security token 164 are authenticated and valid. The second message 166 may include a weblink for the user device 120 of the user 102 to access the application 144 to interact with the entity server 130 for a certain application service between the entity and the user. By activating the first user interface element, the user 102 may access to the second message 166 or activate the security token 164 to interact with the entity server 130 through the user device 120.

At operation 218, the user device 120 receives the validation message 168 from the token server 110. The validation message 168 may be presented to the user device 120 with a first user interface element indicating that the second message 166 is an authenticated text message and the security token 164 is valid. The first user interface element may be an approval indicator which is configured to allow the user device 120 to access the user profile 154 stored in the memory 140 of the entity server 130. For example, the approval indicator may be configured to be activated by the user 102 through the user device 120 to allow the user to interact with the entity about a pending interaction between the user and the entity.

At operation 220, in response to determining that the data stored in the security token 164 associated with the second message 166 does not match the stored data in the memory 118 of the token server 110, the token server 110 sends an invalidation message to the user device 120 with a second user interface element.

At operation 222, the user device 120 receives the invalidation message from the token server 110 and displays a second user interface element indicating that the second message 166 and the security token 164 are unauthenticated. The second user interface element may be configured to be activated by the user 102 through the user device 120 to delete the second message 166 and the corresponding security token 164.

In response to determining that that the data stored in the security token associated with the second message 166 does not match the stored data in the memory 118 of the token server 110, the token server 110 may present a second user interface element indicating that the second message 166 and the corresponding token are unauthenticated and invalid. The second user interface element may be configured to be activated by the user 102 through the user device 120 to automatically delete the unauthenticated second message 166 and the corresponding token.

The practical application leads to technical advantages of improving the current text message verification process. The practical application further detects anomalous messages and fraud authentication codes associated with the text messages. Therefore, the disclosed system effectively protects user security information by preventing anomalous interactions caused by anomalous or fraudulent activities through text massages in the network 160.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system comprising:
   an entity server in communication with a token server via a network, wherein the entity server comprises a processor configured to:
   send a first message to a token server to request the token server to generate a security token, the first message comprising entity information, user information, and instructions associated with verifying an interaction conducted between a user device and the entity server; and
   send a second message and the security token to the user device associated with a user; and
   the token server communicatively coupled to the entity server and comprises a processor configured to:
   in response to receiving the first message from the entity server, generate the security token including token data, wherein the token data comprises the entity information, the user information, the instructions associated with verifying the interaction conducted between the user device and the entity server, and information of a software executed to generate the security token;
   send the security token including the token data to the entity server, wherein the token data is stored in a memory of the token server;
   receive the second message and the security token from the user device for verification;
   verify the second message by determining whether each of the entity information, the user information, the instructions associated with verifying the interaction conducted between the user device and the entity server, and the software executed to generate the security token stored in the security token associated with the second message matches with corresponding each of the entity information, the user information, the instructions associated with verifying the interaction conducted between the user device and the entity server, and the software executed to generate the security token included in the token data stored in the memory of the token server; and
   send a validation message back to the user device in response to determining that each of the entity information, the user information, the instructions associated with verifying the interaction conducted between the user device and the entity server, and the software executed to generate the security token stored in the security token associated with the second message matches with the corresponding each of the entity information, the user information, the instructions associated with verifying the interaction conducted between the user device and the entity server, and the software executed to generate the security token included in the token data stored in the memory of the token server, wherein the validation message is presented to the user device with a first user interface element indicating that the second message is authenticated.

2. The system of claim 1, wherein the processor of the token server is further configured to:
verify whether the first message comprises the entity information of an entity which registers with the token server for generating the security token, wherein the entity information comprises an entity identifier; and
generate the security token for the entity in response to determining that the first message comprises the entity information of the entity which registers with the token server.

3. The system of claim 2, wherein the security token comprises:
the entity identifier of the entity,
a user identifier of the user,
an expiration time, and
an interaction between the user and the entity.

4. The system of claim 3, wherein the user identifier is a user phone number or a user email, and wherein the entity identifier is an entity phone number or an entity email.

5. The system of claim 1, wherein the processor of the token server is further configured to:
in response to determining that each of the entity information, the user information, the instructions associated with verifying the interaction conducted between the user device and the entity server, and the software executed to generate the security token stored in the security token associated with the second message does not match with the corresponding each of the entity information, the user information, the instructions associated with verifying the interaction conducted between the user device and the entity server, and the software executed to generate the security token included in the token data stored in the memory of the token server, send an invalidation message back to the user device by the token server; and
receive, at the user device, the invalidation message from the token server and display a first user interface element indicating that the second message is unauthenticated.

6. The system of claim 1, wherein the second message sent to the user device comprises token server information which is used by the user device to send the second message and the security token to the token server for verification.

7. The system of claim 6, wherein the token server information comprises a communication link associated with the token server which generates the security token.

8. A method comprising:
sending, by an entity server, a first message to a token server to request the token server to generate a security token, the first message comprising entity information, user information, and instructions associated with verifying an interaction conducted between a user device and the entity server;
generating, by the token server, the security token including token data in response to receiving the first message from the entity server, wherein the token data comprises the entity information, the user information, the instructions associated with verifying the interaction conducted between the user device and the entity server, and information of a software executed to generate the security token;
sending the security token including the token data to the entity server by the token server, wherein the token data is stored in a memory of the token server;
sending, by the entity server, a second message and the security token to the user device associated with a user;
receiving, at the token server, the second message and the security token from the user device for verification;
determining, by the token server, whether each of the entity information, the user information, the instructions associated with verifying the interaction conducted between the user device and the entity server, and the software executed to generate the security token stored in the security token associated with the second message matches with corresponding each of the entity information, the user information, the instructions associated with verifying the interaction conducted between the user device and the entity server, and the software executed to generate the security token included in the token data stored in the memory of the token server; and
sending, by the token server, a validation message back to the user device in response to determining that each of the entity information, the user information, the instructions associated with verifying the interaction conducted between the user device and the entity server, and the software executed to generate the security token stored in the security token associated with the second message matches with the corresponding each of the entity information, the user information, the instructions associated with verifying the interaction conducted between the user device and the entity server, and the software executed to generate the security token included in the token data stored in the memory of the token server, wherein the validation message is presented to the user device with a first user interface element indicating that the second message is authenticated.

9. The method of claim 8, further comprising:
verifying, by the token server, whether the first message comprises the entity information of an entity which registers with the token server for generating the security token, wherein the entity information comprises an entity identifier; and
generating the security token for the entity in response to determining that the first message comprises the entity information of the entity which registers with the token server.

10. The method of claim 9, wherein the security token comprises:
the entity identifier of the entity,
a user identifier of the user,
an expiration time, and
an interaction between the user and the entity.

11. The method of claim 10, wherein the user identifier is a user phone number or a user email, and wherein the entity identifier is an entity phone number or an entity email.

12. The method of claim 8, further comprising:
in response to determining that each of the entity information, the user information, the instructions associated with verifying the interaction conducted between the user device and the entity server, and the software executed to generate the security token stored in the security token associated with the second message does not match with the corresponding each of the entity information, the user information, the instructions associated with verifying the interaction conducted between the user device and the entity server, and the software executed to generate the security token included in the token data stored in the memory of the token server, sending an invalidation message back to the user device by the token server; and receiving, at the user device, the invalidation message from the token server and displaying a first user interface element indicating that the second message is unauthenticated.

13. The method of claim 8, wherein the second message sent to the user device comprises token server information which is used by the user device to send the second message and the security token to the token server for verification.

14. The method of claim 13, wherein the token server information comprises a communication link associated with the token server which generates the security token.

15. A method comprising:

sending, by an entity server, a first message to a token server to request the token server to generate a security token, the first message comprising entity information, user information, and instructions associated with verifying an interaction conducted between a user device and the entity server;

generating, by the token server, the security token including token data in response to receiving the first message from the entity server, wherein the token data comprises the entity information, the user information, the instructions associated with verifying the interaction conducted between the user device and the entity server, and information of a software executed to generate the security token;

sending the security token including the token data to the entity server by the token server, wherein the token data is stored in a memory of the token server;

sending, by the entity server, a second message and the security token to the user device associated with a user;

receiving, at the user device, the second message and the security token from the entity server;

sending, by the user device, the second message and the security token to the token server for verification;

determining, by the token server, whether each of the entity information, the user information, the instructions associated with verifying the interaction conducted between the user device and the entity server, and the software executed to generate the security token stored in the security token associated with the second message matches with corresponding each of the entity information, the user information, the instructions associated with verifying the interaction conducted between the user device and the entity server, and the software executed to generate the security token included in the token data stored in the memory of the token server;

sending, by the token server, a validation message back to the user device in response to determining that each of the entity information, the user information, the instructions associated with verifying the interaction conducted between the user device and the entity server, and the software executed to generate the security token stored in the security token associated with the second message matches with the corresponding each of the entity information, the user information, the instructions associated with verifying the interaction conducted between the user device and the entity server, and the software executed to generate the security token included in the token data stored in the memory of the token server; and receiving, at the user device, the validation message from the token server and displaying a first user interface element indicating that the second message is authenticated.

16. The method of claim 15, further comprising:

verifying, by the token server, whether the first message comprises the entity information of an entity which registers with the token server for generating the security token, wherein the entity information comprises an entity identifier; and generating the security token for the entity in response to determining that the first message comprises the entity information of the entity which registers with the token server.

17. The method of claim 16, wherein the security token comprises:

the entity identifier of the entity,
a user identifier of the user,
an expiration time,
an interaction between the user and the entity,
wherein a user identifier is a user phone number or a user email, and
wherein the entity identifier is an entity phone number or an entity email.

18. The method of claim 15, further comprising:

in response to determining that each of the entity information, the user information, the instructions associated with verifying the interaction conducted between the user device and the entity server, and the software executed to generate the security token stored in the security token associated with the second message does not match with the corresponding each of the entity information, the user information, the instructions associated with verifying the interaction conducted between the user device and the entity server, and the software executed to generate the security token included in the token data stored in the memory of the token server, sending an invalidation message back to the user device by the token server; and receiving, at the user device, the invalidation message from the token server and displaying a first user interface element indicating that the second message is unauthenticated.

19. The method of claim 15, wherein the second message sent to the user device comprises token server information which is used by the user device to send the second message and the security token to the token server for verification.

20. The method of claim 19, wherein the token server information comprises a communication link associated with the token server which generates the security token.

* * * * *